W. V. TURNER & W. M. CADY.
CAR DOOR OPERATING DEVICE.
APPLICATION FILED APR. 15, 1916.
1,255,958.
Patented Feb. 12, 1918.
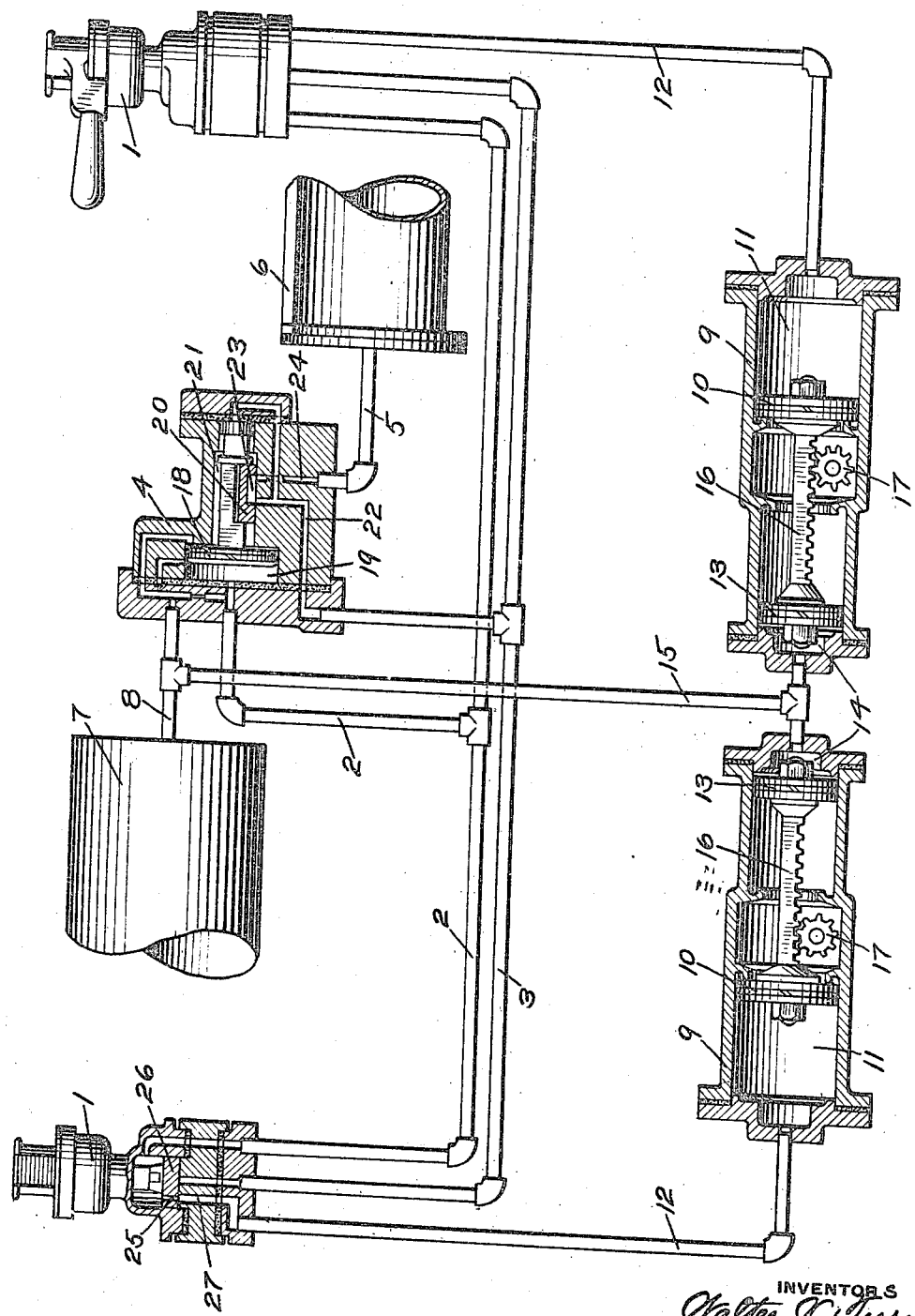
INVENTORS
Walter V. Turner
Wm. M. Cady
by Wm. M. Cady
Atty.

UNITED STATES PATENT OFFICE.

WALTER V. TURNER, OF WILKINSBURG, AND WILLIAM M. CADY, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA.

CAR-DOOR-OPERATING DEVICE.

1,255,958.   Specification of Letters Patent.   Patented Feb. 12, 1918.

Application filed April 15, 1916.   Serial No. 91,282.

*To all whom it may concern:*

Be it known that we, WALTER V. TURNER, and WILLIAM M. CADY, citizens of the United States, residing at, respectively, Wilkinsburg and Edgewood, in the county of Allegheny, State of Pennsylvania, have jointly invented a certain new and useful Improvement in Car-Door-Operating Devices, of which the following is a specification.

This invention relates to door and step operating devices, and more particularly as applied to vehicles operated in electric traction service and the like.

The principal object of our invention is to provide an improved fluid operated door and step controlling device employing a minimum number of parts and adapted to be cheaply manufactured.

In the accompanying drawing, the single figure is a diagrammatic view, partly in section, of a car equipment for controlling the doors and steps and embodying our invention.

According to the drawing, a so-called double ended equipment is illustrated, in which the car can be controlled from either end and comprising a motorman's brake valve 1, at each end of the car, an automatic brake pipe 2, a straight air pipe 3, an emergency valve device 4, connected by pipe 5 to brake cylinder 6, and a main reservoir 7, connected by pipe 8 to said emergency valve device.

According to our invention, a door and step operating cylinder 9 is provided, one for controlling the car doors and steps at each end of the car and within each cylinder is mounted a differential piston comprising a large head 10 contained in chamber 11 connected by pipe 12 to the brake valve 1, and a small piston head 13 contained in piston chamber 14, which is connected by pipe 15 directly to the main reservoir 7. A rack bar 16 connects the piston heads 10 and 13, the teeth of the rack bar being adapted to engage the teeth of a pinion 17 through the operation of which the car doors and steps are controlled.

The emergency valve device 4 may be of a type heretofore employed and comprising a piston 18 contained in piston chamber 19 connected to emergency brake pipe 2 and a valve 20, contained in valve chamber 21 and adapted to be operated by the piston 18 upon a sudden reduction in emergency brake pipe pressure for supplying fluid to the brake cylinder 6 for effecting an application of the brakes.

For normally operating the brakes, fluid is supplied to and released from the straight air pipe 3, which is connected in the normal release position of the valve 20 through passage 22, cavity 23, and passage 24 with brake cylinder 6.

The type of brake equipment shown is known as the two-pipe system, in which the fluid is supplied from the main reservoir and the emergency valve device to the emergency brake pipe for normally maintaining said brake pipe charged and in which the emergency brake pipe is connected to the rotary valve chamber of the brake valve, so that fluid for controlling the brakes by straight air is derived from the emergency brake pipe, so as to do away with the necessity for an additional supply pipe to the brake valve.

In the normal running position of the brake valve 1, port connections are made for supplying fluid through pipe 12 to piston chamber 11, and as desired, similar connections can be made in other positions of the brake valve when it is desired to hold the doors and steps closed.

In operation, fluid under pressure is constantly supplied to the piston chambers 14 of the door operating cylinders, and with the brake valve 1 in running position, or other position in which the doors are to be closed, fluid is also supplied to the larger piston chamber 11, so that the unbalanced fluid pressure acting therein, will operate to hold the differential piston device in the position shown in the drawing for closing the car doors and steps.

When it is desired to open the car door, the brake valve 1 is turned to a position in which fluid is vented from piston chamber 11, so that the fluid pressure constantly present in piston chamber 14 operates to shift the differential piston to the position for opening the car door.

In a double ended equipment, it is desirable or necessary to maintain the door closed at the end of the car remote from the operating end, especially on cars operated and controlled by one man, and for this purpose, a restricted port 25 is provided in the rotary valve 26 of the brake valve 1, which is adapted to register with passage 27 leading to pipe 12 in the handle off position of the brake valve.

It will now be seen that when the motorman leaves one end of the car, as he turns the brake valve to handle off position, so that the brake valve handle can be removed, a connection is made for supplying fluid through pipe 12 to the piston chamber 11 of the door operating cylinder at that end of the car and consequently the door and steps controlled by that cylinder are maintained in the closed position.

When, for any reason, a sudden reduction is made in emergency brake pipe pressure, an emergency application of the brakes is effected and it will now be noted that since the holding of the car doors closed depends upon the maintenance of fluid pressure on the piston 10, as soon as the emergency brake pipe pressure is vented, fluid will also be vented from the piston chamber 11 at each end of the car, so that the car doors and steps will be opened automatically.

The port 25 is preferably made restricted, so as to require a certain period of time for the escape of fluid from the piston chamber 11, since this will allow time for the car to come to a stop by the applying of the brakes, before the car doors will open.

It will now be noted that the equipment herein described does not require the use of extra valves for controlling the supply of fluid to the door operating cylinder and by means of a single pipe to the brake valve, the doors and steps can be opened and closed at will as well as automatically in case of an emergency.

It will be understood that the invention is adapted for single end equipments as well as double end equipments, the construction and operation being substantially the same, except that only one door operating cylinder and one brake valve device is employed.

Having now described our invention, what we claim as new and desire to secure by Letters Patent, is:

1. In a car door and step controlling device, the combination with a piston device constantly subject on one side to fluid under pressure for operating the car doors and steps, a brake pipe, a reduction in pressure in which is adapted to effect an application of the brakes, and means for connecting the brake pipe to the opposite side of said piston device.

2. In a car door and step controlling device, the combination with a piston device for operating the car doors and steps and having differential piston heads, the smaller piston head being constantly subject to fluid under pressure, of an emergency brake pipe, a reduction in pressure in which is adapted to effect an application of the brakes and a brake valve device for normally supplying fluid from the emergency brake pipe to the larger piston head of said piston device.

3. In a car door and step controlling device, the combination with a piston device for operating the car doors and steps and having differential piston heads, the smaller piston head being constantly subject to fluid under pressure, of an emergency brake pipe normally charged with fluid under pressure, a valve device for effecting an application of the brakes upon a reduction in brake pipe pressure, and a brake valve device normally supplying fluid from the emergency brake pipe to the larger piston head of said piston device.

4. In a car door and step controlling device, the combination with a piston device for operating the car doors and steps and having differential piston heads, the smaller piston head being constantly subject to fluid under pressure, of an emergency brake pipe normally charged with fluid under pressure, a valve device for effecting an application of the brakes upon a reduction in brake pipe pressure, and a brake valve device normally suppling fluid from the emergency brake pipe through a restricted port to the larger piston head of said piston device.

5. In a car door and step controlling device, the combination with a piston device for operating the car doors and steps and having differential piston heads, the smaller head being constantly subject to fluid under pressure, of a brake valve device for supplying fluid to the larger piston head in the handle off position.

6. In a car door and step controlling device, the combination with a piston device for operating the car doors and steps and having differential piston heads, the smaller piston head being constantly subject to fluid under pressure, of an emergency brake pipe and a brake valve device adapted in handle off position for supplying fluid from the emergency brake pipe to the larger piston head of said piston device.

7. In a car door and step controlling device, the combination with a piston device for operating the car doors and steps and having differential piston heads, the smaller piston head being constantly subject to fluid under pressure, of an emergency brake pipe and a brake valve device adapted in handle off position for supplying fluid from the emergency brake pipe through a restricted port to the larger piston head of said piston device.

8. In a car door and step controlling device, the combination with a piston device operated by supplying fluid to one side for closing the car doors and steps, of a brake valve device adapted to supply fluid to said piston device in running and handle off positions.

9. The combination with a main reservoir, a brake valve device, a brake pipe adapted to be charged from the main reservoir independently of the brake valve device, and an emergency valve device operated upon a reduction in brake pipe pressure for effecting an application of the brakes, of a piston device for operating the car doors and steps and subject on one side to main reservoir pressure and on the opposite side to fluid supplied from the brake pipe through said brake valve device.

10. The combination with a main reservoir, a brake valve device, a brake pipe adapted to be charged from the main reservoir independently of the brake valve device, and an emergency valve device operated upon a reduction in brake pipe pressure for effecting an application of the brakes, of a piston device having differential piston heads for operating the car doors and steps and having one piston head constantly subject to main reservoir pressure and the other head to fluid supplied from the brake pipe through said brake valve device.

In testimony whereof we have hereunto set our hands.

WALTER V. TURNER.
WILLIAM M. CADY.

Copies of this patent may be obtained for five cents each, by addressing the "Commissioner of Patents, Washington, D. C."